United States Patent Office 3,337,494
Patented Aug. 22, 1967

3,337,494
STABILIZATION OF ISOPRENE POLYMER WITH N,N' - DI(1 - ETHYL-3-METHYLPENTYL)-p-PHENYLENEDIAMINE
Robert J. Reid, Canal Fulton, and Wendell R. Conard, Kent, Ohio, assignors to The Firestone Tire & Rubber Company, Akron, Ohio, a corporation of Ohio
No Drawing. Filed Feb. 28, 1966, Ser. No. 530,390
4 Claims. (Cl. 260—45.9)

This application is a continuation-in-part of application Ser. No. 163,066, filed Dec. 29, 1961, now abandoned.

This invention relates to the stabilization of synthetic, rubbery isoprene polymer having the following composition as determined by infrared analysis:

| | Percent |
|---|---|
| Total 1,4-addition product | At least 80 |
| Cis-1,4-addition product | About 80–96 |
| Trans-1,4-addition product | 0–10 |
| 1,2-addition product | Essentially 0 |
| 3,4-addition product | 3–10 |

N,N'-disubstituted p-phenylenediamines have been used as antioxidants for natural rubber, and they have been proposed for the heat stabilization of polyisoprene, but for such purposes several percent of the antioxidant or stabilizer has been used.

Surprisingly, it has been found that only a very small amount, at least 0.0001 percent and preferably not over 0.02 percent by weight of N,N'-dioctyl p-phenylenediamine (based on the weight of the polyisoprene) effectively stabilizes rubbery synthetic polyisoprene of the above-defined high content of Cis-1,4-addition product against deterioration by heat. The amount of stabilizer used is an amount that results in no discoloration, or only slight discoloration of the polymer.

Light stabilizers can be added to polymers containing the disubstituted p-phenylenediamine of this invention, and particularly useful are the hindered alkylated phenols, such as 2,6 - di - t - butyl - p - cresol, which add light stability to the polymer compositions without harming heat stability or color. They will be incorporated in the usual amount of, for example, 0.01 to 2.0 percent or more, according to stabilization desired.

Polyisoprene of the given composition is obtained by polymerization in the presence of various catalysts. A preferred catalyst is a lithium-based catalyst. This may be metallic lithium or an organolithium compound in which the lithium exerts a sufficiently strong reducing action to displace hydrogen from water. "Organolithium compounds," as used herein, include the various lithium hydrocarbons, i.e., hydrocarbons in which one or more hydrogen atoms have been replaced by lithium, and adducts of lithium with polycyclic aromatic compounds. Suitable lithium hydrocarbons are, for instance, alkyllithium compounds such as methyllithium, ethyllithium, butyllithium, amyllithium, hexyllithium, 2-ethylhexyllithium and hexadecyllithium. Both branched-chain and straight-chain alkyl derivatives are included such as n-butyllithium, sec-butyllithium and tert-butyllithium. In addition to the saturated aliphatic lithium compounds, unsaturated compounds are also suitable such as allyllithium, methallyllithium and the like. Aryl-, alkaryl- and aralkyl-lithium compounds such as phenyllithium, the several tolyl- and xylyl-lithiums, alpha- and beta-naphthyllithium and the like are also suitable. Mixtures of the various hydrocarbon lithium compounds are also suitable. For instance, a catalyst can be prepared by reacting an initial hydrocarbon lithium compound successively with an alcohol and with an olefin such as propylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, pentamethylene dilithium, hexamethylene dilithium, decamethylene dilithium, octadecamethylene dilithium and 1,2-dilithium propane. Other suitable polylithium hydrocarbons are polylithium aryl, aralkyl and alkaryl compounds such as 1,4 - dilithium benzene, 1,5 - dilithium naphthalene, 1,2 - dilithium - 1,3 - triphenyl propane, and the like. Tri- and higher lithium hydrocarbons are also suitable, such as 1,3,5 - trilithium pentane or 1,3,5 - trilithium benzene. Other compounds include the various lithium hydrocarbon amides. Likewise, there may be employed the lithium-polynuclear aromatic hydrocarbon adducts produced by simply reacting lithium metal with naphthalene, anthracene and the like polynuclear aromatic hydrocarbons. The hydrocarbon acquires a negative charge without losing any of its hydrogens, and serves as the anion (the lithium losing an electron to serve as the cation) of the salt. The amount of catalyst used may be as little as 0.00002 percent, and usually no more than 0.1 percent is employed, based on the weight of monomer.

The polymerization is carried out in the absence of water, and preferably in solution, although solvent is not essential. If the polymerization is carried out in solution, a non-polar, non-acidic solvent is employed such as hexane, pentane, petroleum ether (or other straight or branched-chain saturated aliphatic solvent) or an aromatic solvent such as benzene, a toluene or a xylene. The temperatures employed vary from below 0° C. to 100° C., but generally a temperature of 30 to 70° C. is used. The stabilizer is usually added by first dissolving it in the solvent employed. A representative procedure is disclosed in Coral Rubber, A Cis-1,4-Polyisoprene, by F. W. Stavely et al., in Industrial and Engineering Chemistry, 48, 778 (1956).

Various tests were made with the indicated amount of N,N' - di(1-ethyl-3-methylpentyl)-p-phenylenediamine in polymers prepared in this way with lithium-based catalyst and having the following approximate composition by infrared analysis:

| | Percent |
|---|---|
| Cis-1,4-addition product | About 80–96 |
| Trans-1,4-addition product | 0–10 |
| 1,2-addition product | Essentially 0 |
| 3,4-addition product | 3–10 |
| Total 1,4-addition product | At least 80 |

In certain of the test samples other additives were included, as indicated. These were heated in a forced-draft oven at 150° C. and the time required for the various samples to sinter and melt is recorded in Table I together with the percent of gel formed after heating for 24 hours at 100° C. The amount of stabilizer and other additives is given in parts based on 100 parts of dry polymer present.

TABLE I

| Composition of Sample: | Part | Sintering Time, min. | Melting Time | Percent Gel |
|---|---|---|---|---|
| Stabilizer | 0.02 | 60 | V. slight at 90 min | 0.0 |
| DBPC [1] | 0.3 | | | |
| Mineral Oil | 1 | | | |
| Stabilizer | 0.005 | 30 | Slight at 120 min | 0.0 |
| DBPC [1] | 0.3 | | | |
| Stabilizer | 0.005 | 15 | 30 min | |
| Do | 0.01 | 15 | 30-60 min | |
| Do | 0.02 | 30-60 | 60 min | |
| Blank | | | 15 min | |

[1] 2,6-di-t-butyl-para-cresol.

There was no substantial discoloration of any of the materials during the tests.

In another test, a sample of the polyisoprene containing 0.02 part of N,N'-di(1-ethyl-3-methylpentyl)-para-phenylenediamine per 100 parts of the polyisoprene was heated in a forced-draft oven at 100° C. The stock softened but did not melt after 24 hours. No appreciable amount of gel formed. There was no substantial discoloration of the stock.

The stabilized polymers have good heat stability and can readily be made light stable and are useful in products having little or no color as well as in colored products, including cements and molded products. They may be used for example in automobile tires with white or colored sidewalls.

We claim:
1. Rubbery synthetic isoprene polymer having the following composition as determined by infrared analysis:

| | Percent |
|---|---|
| Cis-1,4-addition product | About 80 to 96 |
| Trans-1,4-addition product | 0 to 10 |
| 1,2-addition product | Essentially 0 |
| 3,4-addition product | 3 to 10 |
| Total 1,4-addition product | At least 80 | which polymer contains a heat stabilizing amount of N,N'-dioctyl p-phenylenediamine not in excess of 0.02 part of stabilizer per 100 parts of the polymer.

2. The composition of claim 1 in which the stabilizer is N,N' - di(1-ethyl - 3 - methylpentyl)-para - phenylenediamine.

3. The composition of claim 1 which also includes a light stabilizing amount of 2,6-di-t-butyl-p-cresol.

4. The composition of claim 2 which also contains a light stabilizing amount of 2,6-di-t-butyl-p-cresol.

References Cited

UNITED STATES PATENTS

| 2,867,604 | 1/1959 | Rosenwald et al. | 260—45.9 |
| 3,004,035 | 10/1961 | Csendes | 260—45.9 |

OTHER REFERENCES

Industrial & Eng. Chem. (F. W. Stavely), vol. No. 48, No. 4, April 1956, pp. 778–783.

DONALD E. CZAJA, *Primary Examiner*.

LEON J. BERCOVITZ, *Examiner*.

H. E. TAYLOR, *Assistant Examiner*.